United States Patent [19]

Keys et al.

[11] Patent Number: 4,653,768
[45] Date of Patent: Mar. 31, 1987

[54] FREE SPINNING HANDLEBAR-BRAKE CABLE CONNECTION

[76] Inventors: Kenney L. Keys; Troy L. Keys; Kevin R. Keys, all of 3713 Fairfax Rt. 6, Bakersfield, Calif. 93307

[21] Appl. No.: 844,172

[22] Filed: Mar. 26, 1986

[51] Int. Cl.⁴ ............................................. B62L 3/02
[52] U.S. Cl. .................. 280/279; 74/501 R; 188/24.22
[58] Field of Search ......... 280/279; 74/501 A, 501 B, 74/487, 502; 192/35; 188/24.22

[56] References Cited

U.S. PATENT DOCUMENTS 1,785,315  5/1930  Girardi .......................... 74/487 X
3,567,250  3/1971  Wolf ............................. 74/501 B
4,223,563  9/1980  Kine .............................. 74/487 X Primary Examiner—John A. Pekar
Attorney, Agent, or Firm—Harvey B. Jacobson; Clarence A. O'Brien

[57] ABSTRACT

A pair of upper and lower relatively rotatable collar members are mounted on the upstanding neck portion of a bicycle from which the handlebars supported and which is rotatable relative to the frame of the bicycle with the front fork assembly of the bicycle about an upstanding axis concentric with the neck portion. The collar members are slidable along and rotatable relative to the neck portion and interconnected against axial shifting. The frame of the bicycle includes a pull cable actuated rear wheel brake and the handlebar of the bicycle includes a shiftable pull cable actuator. A first pull cable section is operatively connected between the rear wheel brake and the lower collar member and a second pull cable section is operatively connected between the brake actuator and the upper collar member.

6 Claims, 6 Drawing Figures

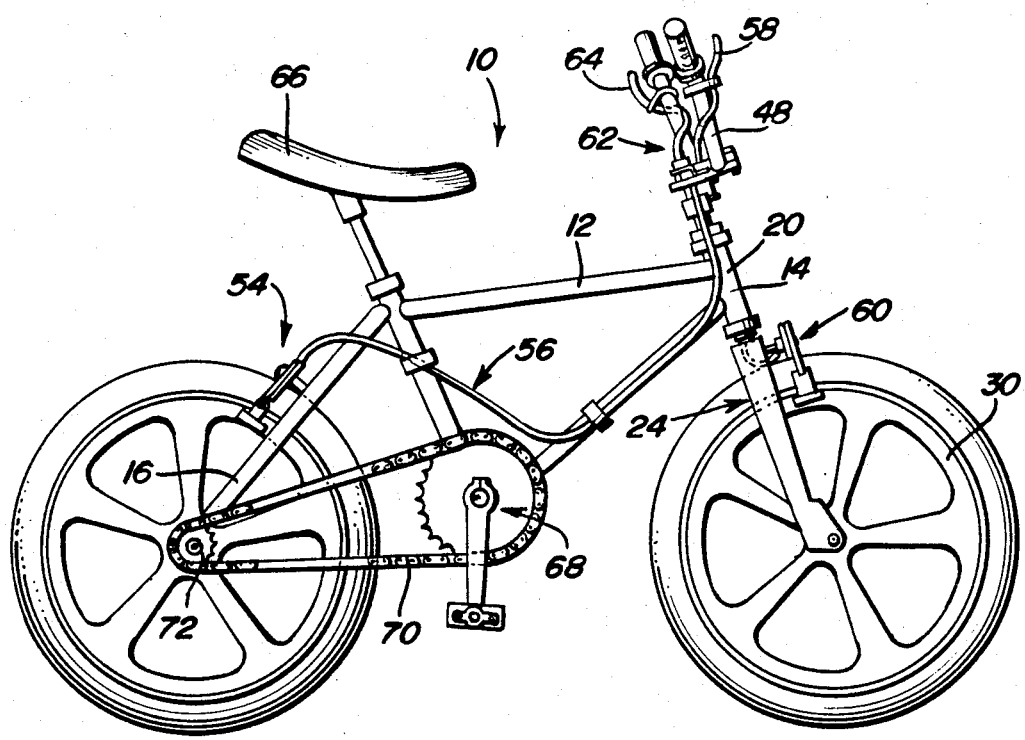
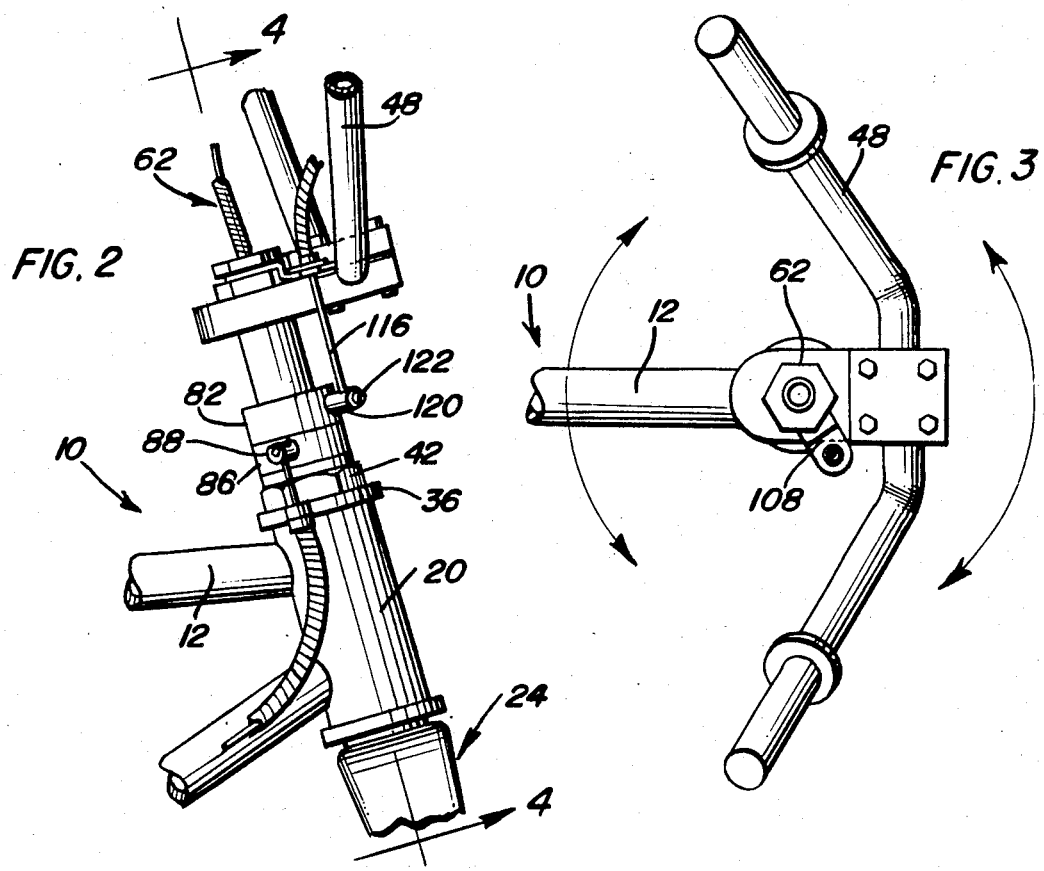

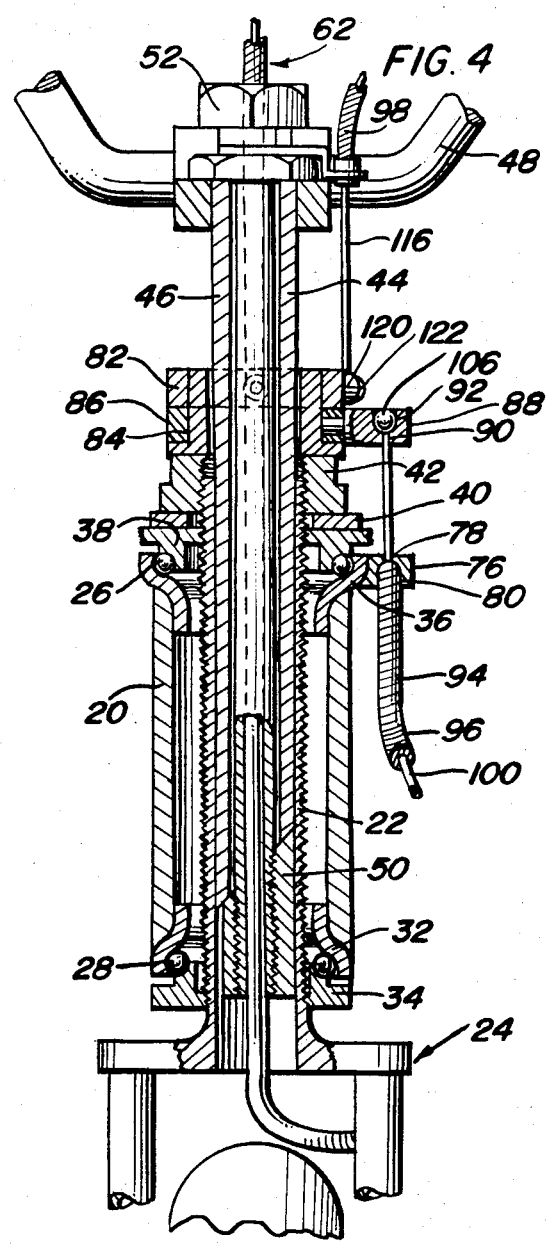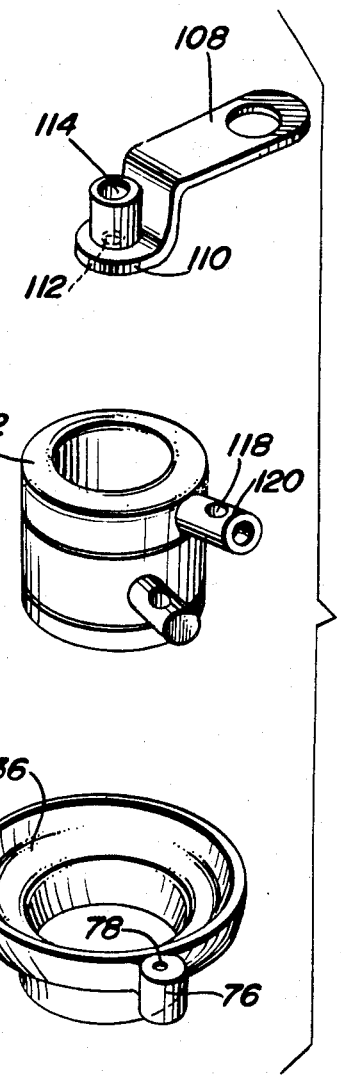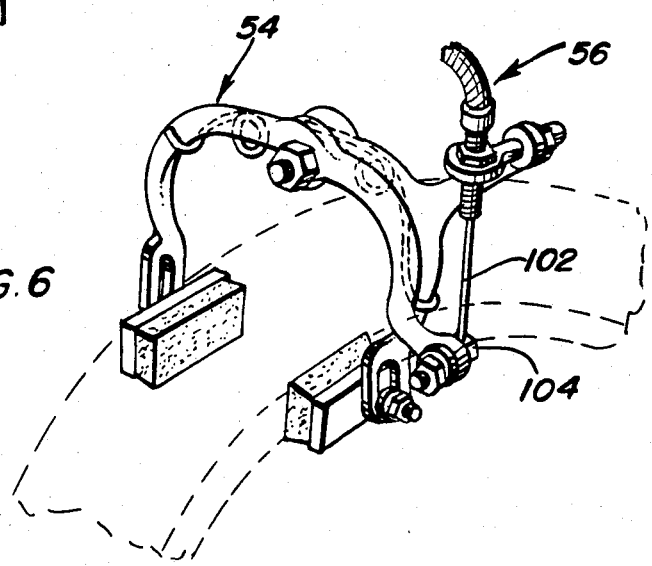

FREE SPINNING HANDLEBAR-BRAKE CABLE CONNECTION

BACKGROUND OF THE INVENTION

1. Field of the Invention

This invention relates to bicyles and more specifically to BMX bicycles having hand brakes and which are used to perform different forms of acrobatics. More specifically, the invention resides in the provision of a rotatable rear brake actuator connection at the handlebar stem for the hand brake operating mechanism of the rear wheel brake and to be used in conjunction with a hollow handlebar stem bolt through which the actuating cable for the front brake of the bicyle may pass.

2. Description of Related Art

Various different forms of rotatable connections heretofore have been provided such as those disclosed in U.S. Pat. Nos. 2,143,985, 2,438,548, 2,763,089, 2,957,353 and 3,133,756. However, these previously known forms of rotatable connections do not include sufficent structural features for adaptation to a bicyle in order to provide an effective rotatable connection between a bicycle rear wheel brake and the handlebar operator therefor sufficient to enable the handlebar and attached front wheel fork assembly of the bicycle to be freely spun relative to the bicycle frame.

SUMMARY OF THE INVENTION

The brake cable connection of the instant invention incorporates a pair of collar members mounted upon the handlebar support neck portion or mounting stem of a bicycle for rotation relative thereto and to each other, sliding along the mounting stem and interconnected against relative axial shifting.

The lower collar member on the handlebar mounting stem includes a radial outward projection to which one end of the core of an operating cable connected at its remote end to the rear brake mechanism may be connected and the upper collar member includes a radial outward projection to which one end of the core of a second operating cable is connected having the remote end thereof connected to a handlebar mounted actuating lever for the bicycle rear brake, the collars establishing an effective pull connection between the first and second mentioned operating cables and wherein the pull connection allows free spinning of the handlebar and front fork assembly relative to the associated bicycle frame.

The main object of this invention is to provide a rotatable connection between first and second bicycle frame and handlebar mounted brake operated pull cables and enabling free spinning of the handlebar and front wheel assembly relative to the associated bicycle frame.

Another object of this invention is to provide a cable connection in accordance with the preceding object and constructed in a manner whereby the invention may be readily incorporated into the manufacture of new bicycles as well as readily operatively associated with existing bicycles.

Another important object of this invention is to provide a pull cable connection which may be marketed in a single kit form for operative association with substantially all models of BMX bicycles presently being marketed.

Yet another object of this invention is to provide a hand brake pull cable connector which may be adapted to bicycles produced by different manufacturers.

A final object of this invention to be specifically enumerated herein is to provide a pull cable connector in accordance with the preceding objects and which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a right side elevational view of a BMX-type bicycle with which the cable connection of the instant invention is operatively associated;

FIG. 2 is an enlarged fragmentary side elevational view of the front frame portion and front fork and handlebar assembly area of the bicycle illustrating the cable connection operatively associated therewith;

FIG. 3 is a fragmentary top plan view of the assemblage illustrated in FIG. 2;

FIG. 4 is an enlarge fragmentary vertical sectional view taken substantially upon the plane indicated by the section line 4—4 of FIG. 2;

FIG. 5 is an exploded perspective view of the major components together comprising the cable connection of the instant invention; and FIG. 6 is a fragmentary perspective view illustrating the rear brake mechanism of the bicycle illustrated in FIG. 1 and with the rear end of the rear brake cable operatively connected to the rear brake mechanism.

DESCRIPTION OF THE PREFERRED EMBODIMENT

Referring now more specifically to the drawings, the numeral 10 generally designates a bicycle including a frame 12 having front and rear portions 14 and 16. A rear wheel 18 is journalled from the rear portion 16 and the front portion 14 includes a rearwardly and upwardly inclined tube 20 through which an upstanding externally threaded mounting tube 22 of a front fork assembly referred to in general by the reference numeral 24 is rotatably journalled through the utilization of upper and lower bearings 26 and 28. The lower end of the tube 20 includes an inner bearing race 32 for the bearings 28 and the front fork assembly 24 includes an outer bearing race 34 for the bearings 28. In addition, the upper end of the tube 20 includes a removable inner bearing race 36 for the upper bearings 26 and an outer bearing race 38 is threadedly mounted upon the upper end of the mounting tube 22 which projects through the tube 20.

A washer 40 and nut 42 are disposed on the tube 22 above the outer bearing race 38 with the nut 42 threadedly engaged with the upper end of the tube 22 and the front fork assembly 24 supports an elongated handlebar support neck portion 44 therefrom which is of tubular construction and includes an upper portion 46 from which a handlebar 48 is mounted and a lower wedge portion 50 disposed in the lower end of the mounting tube 22, a bolt 52 extending downwardly through the upper portion 46 and being threadedly engaged in the lower wedge portion 50.

A rear wheel brake assembly 54 is mounted from the rear portion 16 and operatively associated with the rear wheel 18 and has one end of a pull cable assembly referred to in general by the reference numeral 56 operatively connected thereto, the other end of the pull cable assembly 56 being operatively connected to a pull lever 58 pivotally mounted from the right side of the handlebar 48. A front wheel brake assembly referred to in general by the reference numeral 60 is mounted from the front fork assembly 24 and one end of a second pull cable assembly referred to in general by the reference numeral 62 is operatively connected to the front wheel brake assembly 60 at one end and to a second pull lever 64 mounted on the left-hand end of the handlebar 48. Further, the bicycle includes an operator's seat 66, a combined crank pedal and sprocket assembly 68 journalled from the frame 12 and a chain 70 drivingly connecting the assembly 68 to a sprocket wheel 72 operatively connected to the rear wheel 18 for driving the latter.

The preceding description is that of a conventional bicycle equipped with hand brakes. If desired, the sprocket wheel may be operatively connected to the drive wheel 18 through the utilization of a one-way clutch, a coaster brake assembly of the free wheeling type or by a connection preventing relative rotation between the sprocket wheel 72 and the rear wheel 18.

The pull cable assemblies 56 and 62 conventionally comprise single cable assemblies establishing connections between the handlebar 48 and the frame 12 and do not allow free rotation of the handlebar and front fork assembly 24 relative to the frame 12. However, BMX bicycles are often used to perform acrobatics in competitive events and at least some acrobatics involve the free spinning of handlebars and front fork assemblies. Accordingly, a need exists for structure by which a bicycle equipped with hand brakes may have its handlebar and front fork assembly spun in a free manner relative to the frame of the bicycle.

The bicycle 10 is modified to adapt the front wheel brake assembly for free spinning of the front fork assembly 24 and handlebar 48 merely by removal of the conventional solid bolt corresponding to the bolt 52 and replacement of that solid bolt with the tubular bolt 52. In this manner, the cable assembly 62 may be passed loosely downwardly through the neck portion 44 and mounting tube 22 of the front fork assembly 24. With this minor change the front fork assembly 24 and handlebar 48 may be freely spun relative to the frame 12 without interference with the cable assembly 62.

On the other hand, the rear brake cable assembly 56 presents a more serious problem and cannot also be passed downwardly through the tubular bolt 52.

Rather, the conventional inner bearing race 36 for the upper bearings 26 is removed and replaced by the bearing race 36. The bearing race 36 differs from a conventional inner bearing race primarily in that it includes an outstanding mounting lug portion 76 having a small diameter vertical bore 78 formed therethrough including a diametrically enlarged lower end counterbore. In addition, an upper collar member 82 is slidably and rotatably mounted on the neck portion 44 above the nut 42 and includes a circumferential groove 84 in which a lower collar member 86 is rotatably received. The lower collar member 86 includes an outstanding mounting lug portion 88 having a small diameter bore 90 formed therethrough including a diametrically enlarged upper end counterbore 92 and the lugs 88 and 76 are registered. The outer housing 94 which conventionally extends the full length between the brake assembly 54 and the lever 58 is cut adjacent the tube 20 in order to define separate housing sections 96 and 98 and the original core of the outer housing 94 is removed. The end of the housing section 96 remote from the brake assembly 54 is seated in the counterbore 80 and a first replacement core section 100 is threaded through the housing section 96 and has one end 102 operatively connected to the brake assembly 54 as at 104. The other end of the core section 100 extends through the bore 90 and includes an enlargement 106 seated in the counterbore 92.

A mounting bracket 108 is mounted from the upper end of the neck portion 44 beneath the head of the bolt 52 and includes an outer end 110 having a small diameter bore 112 formed vertically therethrough including a diametrically enlarged upper end counterbore 114. The cut end of the housing section 98 is seated in the counterbore 100 and a second replacement core section 116 is threaded through the housing section 98 from the lever 58, through the bore 112 and through a small diameter transverse bore 118 formed in an outstanding lug 120 carried by the upper collar member 82, the lug 120 having a set screw 122 operatively engaged therewith for anchoring the end of the core section 116 remote from the lever 58 to the lug 120.

With the modified pull cable assembly 56 comprising the housing sections 96 and 98 and the core sections 100 and 116 and through the utilization of the collar members 82 and 86 to which the core sections 116 and 100 are anchored, a pull on the lever 58 will exert an upward pull on the collar member 82 and thus an upward pull on the collar member 86 as well as a pull on the core section 100 in order to actuate the rear wheel brake assembly 54. However, inasmuch as the collar members 82 and 86 are relatively rotatable, the front fork assembly 24 and handlebar 48 may be freely spun relative to the tube 20 and frame 12.

Thus, only the race 36, the collars 82 and 86, the mounting bracket 108 and the replacement core sections 100 and 116 are required in order to allow the front fork assembly 24 and handlebar 48 to be freely spun relative to the frame 12 without interference with the rear brake assembly. Interference with the front brake assembly is eliminated by passing the pull cable assembly 62 downward through the replacement hollow or tubular bolt 52.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a bicycle including a frame having front and rear ends, a rear wheel journalled from said rear end and a front fork assembly journalled from said front end for angular displacement relative thereto about an upstanding axis and having a front wheel journalled therefrom, rear brake means operatively associated with said frame and rear wheel for releasably variably braking said rear wheel relative to said frame and including a brake operator movably mounted from said frame, first elongated motion transmitting means having first and second ends, said first end being attached to said operator and said second end being disposed adjacent said front fork assembly, said front fork assembly including an elongated handlebar support neck portion projecting upwardly and mounted from said front fork assembly for angular displacement therewith and disposed generally concentric with said axis, a rear brake operator mounted for shifting relative to said neck portion, second elongated motion transmitting means having first and second ends and the first end thereof attached to said actuator and the second end thereof disposed adjacent said neck portion, first and second upper and lower collar members slidably and rotatably mounted on said neck portion, rotatable relative to each other and interconnected against relative axial shifting, and means operatively connecting the second ends of said first and second motion transmitting means to said lower and upper collar members, respectively.

2. The bicycle of claim 1 wherein said upper collar member defines a circumferential groove extending thereabout intermediate the opposite axial ends thereof, said lower collar member being rotatably received in said groove.

3. The bicycle of claim 1 wherein said first and second motion transmitting means comprise first and second pull cable assemblies each including an outer housing portion and an inner core portion, first support means carried by said front end adjacent said neck portion for supporting the end of the housing portion of said second end of said first motion transmitting means from said frame, second support means carried by said neck portion above said collar members, the end of the housing portion of said second end of said second pull cable assembly being supported from said second support means, said first and second collar members including means anchoring corresponding ends of said inner core portions thereto.

4. The bicycle of claim 3 wherein said upper collar member defines a circumferential groove extending thereabout intermediate the opposite axial ends thereof, said second collar member being rotatably received in said groove.

5. The bicycle of claim 1 wherein said neck portion and front fork assembly together define a passage extending longitudinally therethrough concentric with said axis, said second elongated motion transmitting means extending through said passage.

6. The method of modifying a bicycle for free spinning of the handlebar and front fork assembly thereof relative to the bicycle frame and wherein the bicycle is of the type including a frame from which a rear wheel is journalled, a rear wheel brake assembly mounted from the frame for actuation to adjustably brake the rear wheel, a front fork assembly journalled from the frame for rotation relative thereto about an upstanding axis, a front wheel journalled from the front fork assembly, an upwardly projecting handlebar supporting neck portion mounted from the front fork assembly for rotation therewith and disposed generally concentric with said axis and a brake actuator mounted on the handlebar and operatively connected to the rear brake assembly for actuation thereof through the utilization of a connecting pull cable assembly; said method comprising modifying said pull cable assembly to form front and rear pull cable assembly sections with the front section thereof operatively connected to the brake actuator and the rear section thereof operatively connected to the rear wheel brake assembly and the front and rear cable sections including free ends remote from the brake actuator and the brake assembly, respectively, and positioned adjacent upper and lower portions, respectively, of said neck portion, mounting a pair of upper and lower concentric collar members on said neck portion for sliding movement therealong and rotation thereabout and with said collar members rotatable relative to each other and interconnected against relative axial shifting, and connecting the free ends of said front and rear cable sections to said upper and lower collar members.

* * * * *